H. M. PERRY.
ANTIFRICTION BEARING FOR RAILWAY CARS.
APPLICATION FILED MAR. 18, 1918.
1,293,184.
Patented Feb. 4, 1919.
2 SHEETS—SHEET 1.
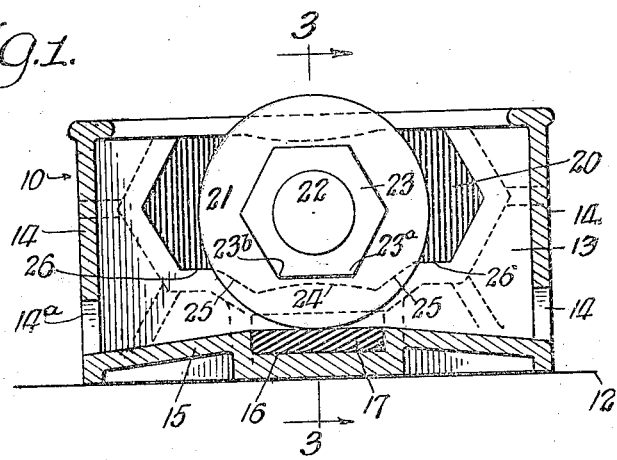
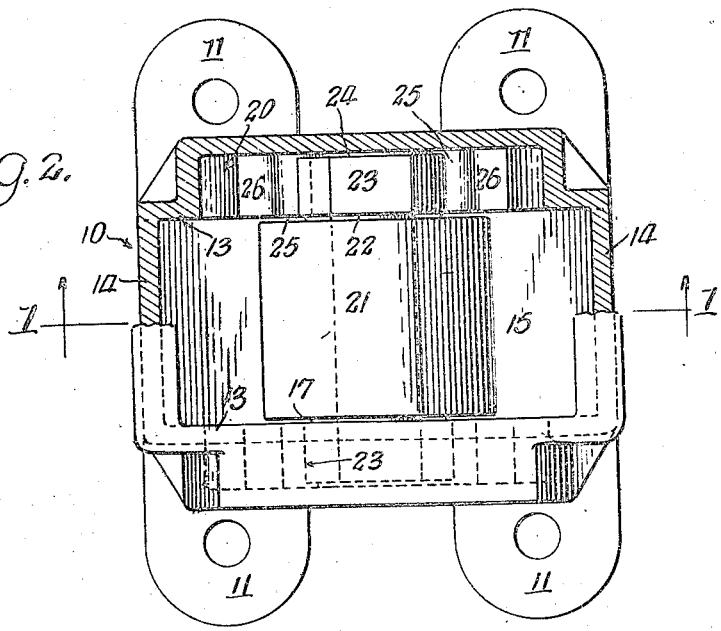
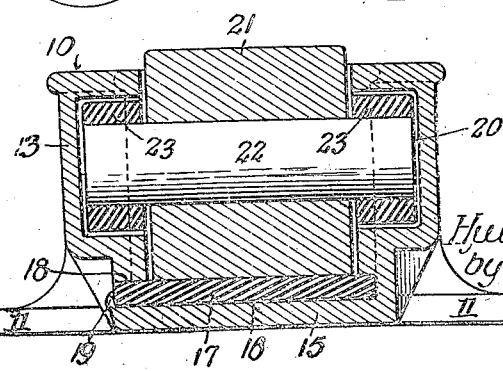
Inventor
Hubert M. Perry
Witnesses:

H. M. PERRY.
ANTIFRICTION BEARING FOR RAILWAY CARS.
APPLICATION FILED MAR. 18, 1918.
1,293,184.
Patented Feb. 4, 1919.
2 SHEETS—SHEET 2.
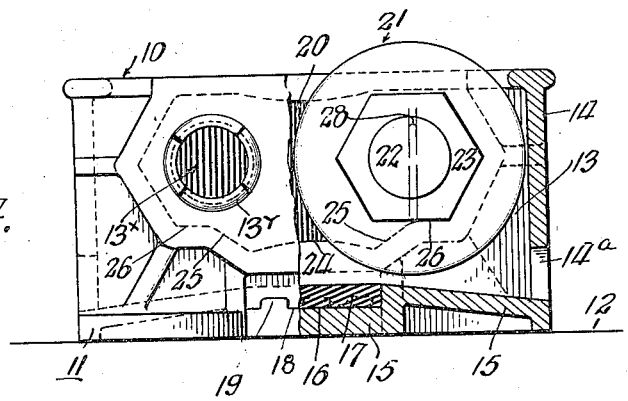
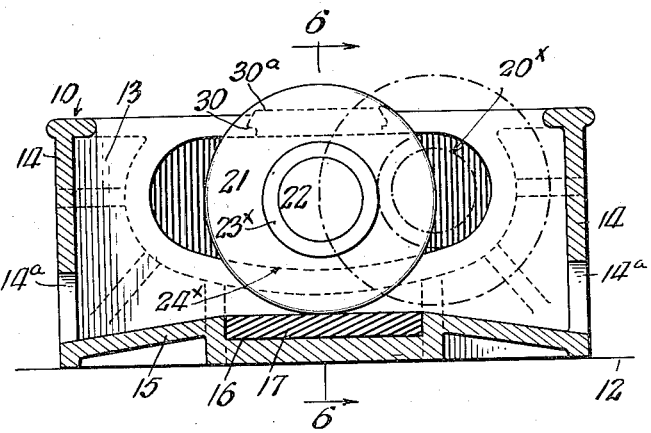
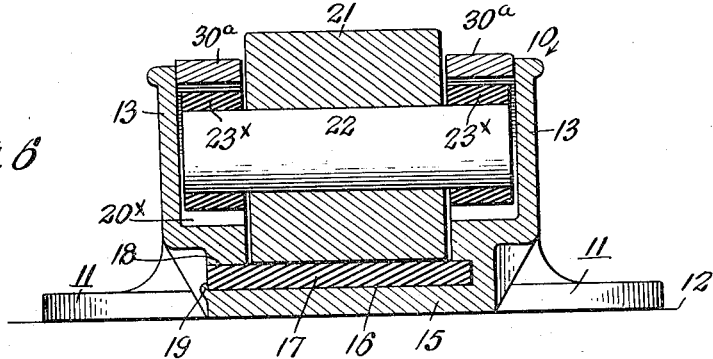

UNITED STATES PATENT OFFICE.

HUBERT M. PERRY, OF CHICAGO, ILLINOIS, ASSIGNOR TO ALBERT G. WELCH, TRUSTEE OF EDWIN S. WOODS, DECEASED.

ANTIFRICTION-BEARING FOR RAILWAY-CARS.

1,293,184.

Specification of Letters Patent. Patented Feb. 4, 1919.

Application filed March 18, 1918. Serial No. 223,017.

*To all whom it may concern:*

Be it known that I, HUBERT M. PERRY, a citizen of the United States, and a resident of Chicago, in the county of Cook and State of Illinois, have invented certain new and useful Improvements in Antifriction-Bearings for Railway-Cars; and I do hereby declare that the following is a full, clear, and exact description thereof, reference being had to the accompanying drawings, and to the letters of reference marked thereon, which form a part of this specification.

This invention relates to improvements in antifriction bearings for railway cars and consists of the matters hereinafter described and more particularly pointed out in the appended claims.

One of the objects of the present invention is to provide a novel and improved antifriction bearing of the kind in which the load is transmitted through the body of a rolling antifriction element, which, when it has traveled in either direction from its normal central position, to the limit of its movement in the casing, will then, upon further relative movement in the same direction by the parts between which it is interposed, rotate about its axis and act as a rotative bearing.

The many advantages of an antifriction bearing made in accordance with my invention will be manifest from the following specification.

In the drawings:

Figure 1 is a view representing a longitudinal, vertical section through an antifriction bearing embodying my invention, the plane of the section being indicated by the line 1—1 of Fig. 2.

Fig. 2 is a view representing a top plan view of the same with parts broken away to more clearly show the interior construction thereof.

Fig. 3 is a view representing a transverse, vertical, section through the improved antifriction bearing, the plane of the section being indicated by the line 3—3 of Fig. 1.

Fig. 4 is a view partly in side elevation and partly in longitudinal section and showing the antifriction element in changed position from that illustrated in Fig. 1.

Fig. 5 is a view similar to that shown in Fig. 1, but illustrating a modified form of my invention.

Fig. 6 is a view representing a transverse, vertical section through the modified form of the invention, the plane of the section being indicated by the line 6—6 of Fig. 5.

Referring now to that embodiment of my invention, which is illustrated in Figs. 1 to 4 of the drawings:—10 indicates the casing, which is an oblong, rectangular shell open at its top and provided with ears or flanges 11 at its bottom, for attachment to the truck bolster 12 of a railway car. 13, 13 indicate the side walls; 14, 14 indicate the end walls, and 15 indicates the bottom wall of the casing. Said bottom wall has a transversely extending groove 16 in which is located a wear plate 17, that is introduced into said groove through a slot 18 (see Fig. 3) in one of the side walls of the casing, there being lugs 19, which are adapted to be bent over into a position locking said wear plate in said groove. The bottom wall 15 is inclined downwardly in each direction from said wear plate toward the end walls of the casing. Said end walls have the usual openings 14ª through which any cinders, sand or dust may escape from the casing. In the side walls 13 of the casing are provided longitudinally extending grooves 20, 20.

21 indicates an antifriction roller which has a shaft 22 that projects beyond its ends into the grooves 20, in the side walls of the casing. Said roller normally rests upon the wear plate 17 in the bottom wall of the casing. The wear plate terminates at each end short of the ends of the full length of travel of the roller in the casing, so that said roller leaves the wear plate just before it reaches either end of its limit of travel.

Mounted on the ends of the shaft 22, within the planes of those parts of the side walls 13, defining the grooves 20, are bearing sleeves or bushings 23. In Figs. 1 to 4 inclusive, said bearing sleeves as to their outer form, are polygonal and are, preferably, hexagonal, and the ends of the grooves 20 are formed to fit and receive and lock said sleeves against movement. Said grooves between their ends, are of width and shape to prevent the bushings to turn with the roller and its shaft.

When the antifriction element is normally at rest upon the wear plate 17, at the middle of the casing, the hexagonal bearing bushings are disposed so that they will not engage the defining edges of the grooves 20. When the roller 17 begins to travel endwise of the casing in the transmission of load, the hexagonal bearing bushings will of course travel with the shaft 22, the bottom wall of that part of the side wall 13 defining said groove, being shaped or formed accordingly, as will now be described.

Assuming that the roller is traveling toward the right hand end of the casing from the position shown in Fig. 1, to the position shown in Fig. 4, the corner 23ª of the hexagonal bearing sleeve 23 will move downwardly and the corner 23ᵇ will move upwardly. To provide for this movement the bottom wall of the groove 20 is made convex, as at 24, which convexity is connected by upwardly and outwardly inclined parts 25 that meet horizontal end parts 26 of the bottom wall of the grooves 20. The end parts 26 of the bottom wall of the groove 20 are spaced apart a distance greater than the length of the wear plate 17, so that in the travel of the antifriction element toward either end of the casing, one of the flattened sides of the hexagonal bearing sleeves will climb upon said horizontal end parts 26 and slightly elevate the antifriction element, so as to raise it into a position wherein it is free from the wear plate and wherein the bearing sleeves will engage the correspondingly shaped ends of the grooves. With the parts in this position, as shown in Fig. 4, the bearing sleeves are locked against further movement and the roller and its shaft are free to rotate in the locked bearing sleeves or bushings.

With the roller now at the end of its movement in the casing, such pounding as is now delivered to it from the body bolster (not shown) is transmitted to the supporting edges of the grooves over substantially large areas, so that wear is obviated and the indentations or notches heretofore produced in this type of bearing, which prevented the normal return of the roller to center, are eliminated and prevented.

When the roller is at the ends of its path of travel in the casing, its center of gravity is located nearer the middle of the casing than the inner end of the supporting wall or edge of the groove 20, a distance indicated at 28, as is shown in dotted lines in Fig. 4. Thus when the antifriction element is relieved from load, it will tend under the action of gravity, to return to its rolling bearing on the wear plate 17 and on that to its normal, central position in the casing.

The antifriction element is introduced into the casing in this instance through the open top of the casing, after a bearing sleeve has been placed in each groove in alinement with a hole 13ˣ in one of the side walls of the casing, after which the shaft 22 is inserted through said hole and through the alined sleeves and antifriction element. After the shaft is in place, lugs 13ʸ on the outside of the side wall of the casing about said hole, are bent over to partially close said hole and to lock said shaft against displacement.

In Figs. 5 and 6 of the drawings is illustrated a modified form of the invention. In this case, the bearing sleeves 23ˣ are made cylindrical instead of hexagonal, as in the case of the bearing sleeves 23 before mentioned. The grooves 20ˣ in the side walls 13 of the casing, are formed with their ends of the casing, are formed with their ends adapted to receive said cylindrical sleeves 23ˣ. The bottom wall 24ˣ of the grooves are made to curve upwardly from the middle of the casing toward the arcuate ends of said grooves so that when the antifriction element is released from load at the ends of its path of travel, in said casing, it will return by gravity to its normal, central position in said casing. The top part of the side walls 13 of the casing are cut away as at 30 to permit of the introduction of the antifriction element with its shaft and sleeves into said casing, after which filler blocks 30ª are locked in said cut away parts in any desirable manner.

The advantages of my improved antifriction bearing will be apparent to those familiar with the art. After the antifriction element has traveled in said casing through a predetermined distance, its peripheral bearing surface will no longer be in engagement with the wear plate, but said element will be capable of rotation about a fixed axis without grinding noise or wear.

I claim as my invention:

1. In an antifriction bearing, a casing having side walls, a roller in said casing, means providing a bearing surface of limited length upon which said roller engages, shaft projections at the ends of said roller, bushings on said shaft projections, and means providing channels or ways for said bushings, in the side walls of said casing, said channels extending beyond the ends of said bearing surface and being constructed at their ends to grip and support said bushings when the roller passes the ends of said bearing surface.

2. In an antifriction bearing, a casing having side walls, a roller in said casing, means providing a bearing surface of limited length upon which said roller engages, a shaft upon which said roller has rotative bearing, said shaft projecting beyond the ends of the roller, bushings on the projecting ends of said shaft, and means providing channels or ways for said bushings in the side wall of said casing, said channels extending beyond the ends of said bearing surface and being constructed at their ends to grip and support said bushings when the roller passes the ends of said bearing surface.

3. In an antifriction bearing, a casing having side walls, a roller in said casing, means providing a bearing surface of limited length upon which said roller engages, shaft projections at the ends of said roller, polygonal bushings on said shaft projections, and means providing channels or ways for said bushings in the side walls of said casing, said channels extending beyond the ends of said bearing surface, and being constructed at their ends to grip and support said polygonal bushings when the roller passes the ends of said bearing suface.

4. In an antifriction bearing, a casing having side walls, a roller in said casing, means providing a bearing surface of limited length upon which said roller engages, a shaft upon which said roller has rotative bearing, said shaft projecting beyond the ends of the roller, polygonal bushings on the projecting ends of said shaft, and means providing channels or ways for said bushings in the side walls of said casing, said channels extending beyond the ends of said bearing surface and being constructed at their ends to grip and support said polygonal bushings when the roller passes the ends of said bearing surface.

5. In an antifriction bearing, a casing having side walls, a roller in said casing, means providing a bearing surface of limited length upon which said roller engages, shaft projections at the ends of said roller, polygonal bushings on said shaft projections, and means providing channels or ways for said bushings in the side walls of said casing, said channels extending beyond the ends of said bearing surface and being constructed at their ends to grip and support said polygonal bushings in an overbalanced position when the roller passes the ends of said bearing surface, so that said roller will, when released from load, return by gravity to a central position in said casing.

6. In an antifriction bearing, a casing having side walls, a roller in said casing, means providing a bearing surface of limited length upon which said roller engages, a shaft upon which said roller has rotative bearing, said shaft projecting beyond the ends of the roller, hexagonal bushings on the projecting ends of said shaft, and means providing channels or ways for said bushings in the side walls of the casing, said channels extending beyond the ends of said bearing surface and being constructed at their ends to grip and support said hexagonal bushings in an overbalanced position when the roller passes the ends of said bearing surface, so that said roller will, when released from load, return by gravity to a central position in said casing.

In testimony that I claim the foregoing as my invention I affix my signature in the presence of two witnesses, this 20th day of February A. D. 1918.

HUBERT M. PERRY.

Witnesses:
T. H. ALFREDS,
D. DARRENOUGH.